Jan. 16, 1962 W. J. TOULIS 3,017,608
SPHERICAL ACOUSTICAL LENS SYSTEM FOR
FOCUSING UNDERWATER SOUND
Filed July 7, 1954 4 Sheets-Sheet 1

INVENTOR.
W. J. TOULIS

BY

George E. Pearson
ATTORNEYS

60" COMPLIANT GRATING SPHERICAL ACOUSTIC LENS

Jan. 16, 1962  W. J. TOULIS  3,017,608
SPHERICAL ACOUSTICAL LENS SYSTEM FOR
FOCUSING UNDERWATER SOUND
Filed July 7, 1954  4 Sheets-Sheet 3

INVENTOR.
W. J. TOULIS
BY
George E. Pearson
ATTORNEYS

United States Patent Office 3,017,608
Patented Jan. 16, 1962

3,017,608
SPHERICAL ACOUSTICAL LENS SYSTEM FOR
FOCUSING UNDERWATER SOUND
William J. Toulis, 4781½ Orchard Ave.,
San Diego 7, Calif.
Filed July 7, 1954, Ser. No. 441,954
11 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention relates to acoustic lens systems and more particularly to spherical acoustic lenses for focusing underwater sound in fluid media wherein range and bearing can be determined automatically, continuously and nearly instantaneously for a number of random sources at sea. The spherical lens is characterized by a narrow unidirectional beam in all planes, a focal point within or without the lens, a very broad frequency response, relatively high discrimination against local noise, and a high adaptability to rapid scanning and direction finding. These unusual properties of the lens of this invention may best be used either for pulsed sonar or for continuous or slowly varying signals as in the case of screw noise. In the former case, a series of transducers fixed uniformly about the lens is preferred for instantaneous presentation of range and bearing. In the latter case, accurate bearing can be derived from a system involving two small adjacent transducers with their outputs connected differentially while being rotated rapidly and concentrically about the lens. Automatic range, in the latter case, may be derived from the difference in bearings or two such lens systems if they are operated synchronously and the information presented simultaneously on an oscilloscope as intensity modulation. Alternately, range may be estimated with one lens alone by determining the vertical angle of incidence of the signal and also the depth of the lens below the surface and/or the depth of the sea floor where presumably the reflection of the signal takes place. The vertical angle may be determined in a variety of ways, an example being the mounting of a number of crystals on an arc and rotating it mechanically about the lens. Scanning of the crystals periodically should reveal the vertical angle as well as the horizontal angle.

The use of spherical lenses dates back to 1917 when the French navy used the Walser "blister" gear type of lens. However, because of the failure to realize their great versatility and potentialities and failure to improve their design and construction methods, these lenses were bypassed and were replaced by other systems in present use. These systems have the disadvantage of being unable to detect targets from any direction without complex mechanical systems for rotation or electronic methods for phasing large arrays which are essential for the detection of far away and weak signals and when high bearing accuracies are required in the presence of noise.

The spherical lenses of the present invention are not only less sensitive to local noise and do not require rotation, but also may be used to detect several targets in different directions simultaneously. The lens of the present invention is intended to supplant those systems where high directionality and the suppression of self-noise or sound from nearby sources are important in the detection of distant targets. In SOFAR arrays, underwater object location systems, active sonar systems and other phases of underwater sound detection problems, the lens of the present invention is simpler, more effective and capable of further improvements not possible with other systems. When compared with the arrays in present use, the lenses of the present invention can do all that these arrays can do and offer the following additional advantages: They are relatively insensitive to local noise, they require no mechanical rotation for omnidirectional scanning (except for the rotation of a small transducer in certain applications), they require no phasing networks for scanning in various directions, they yield very accurate bearings in elevation as well as in azimuth, they require a relatively small number of transducer elements for a given directivity index, they may be employed as an underwater sound camera when spherical aberration has been overcome, they may be employed for underwater sound telephony with simple means for transmitting or receiving in single, multiple or all directions simultaneously, they can be made to provide constant beamwidths over a very large range of frequencies, they provide a simple means by which the distance of a target may be estimated by passive listening, and they are relatively inexpensive, simple and easy to construct.

An object of the present invention is the provision of a lens that will bring to a reasonably sharp focus sound waves originating at any finite distance so that the bearing and distance of any and all targets in one or all directions may be determined without requiring reorientation of the bulk of the detecting system for targets in different directions.

Another object is to provide a lens that is relatively insensitive to local noise.

Another object is to provide a lens that is simpler, more effective and less expensive than systems now being used.

Other objects and many of the attendant advantages of this invention will be readily appreciated as the same becomes better understood by reference to the following detailed description when considered in connection with the accompanying drawings wherein.

Figure 1:
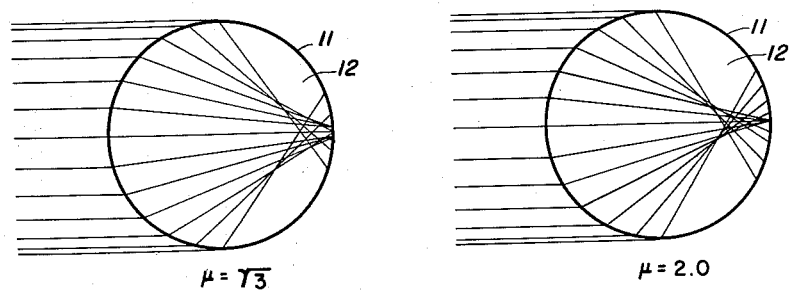
FIG. 1 shows spherical acoustic lens systems having different uniform indexes of refraction.
Figures 2, 3:
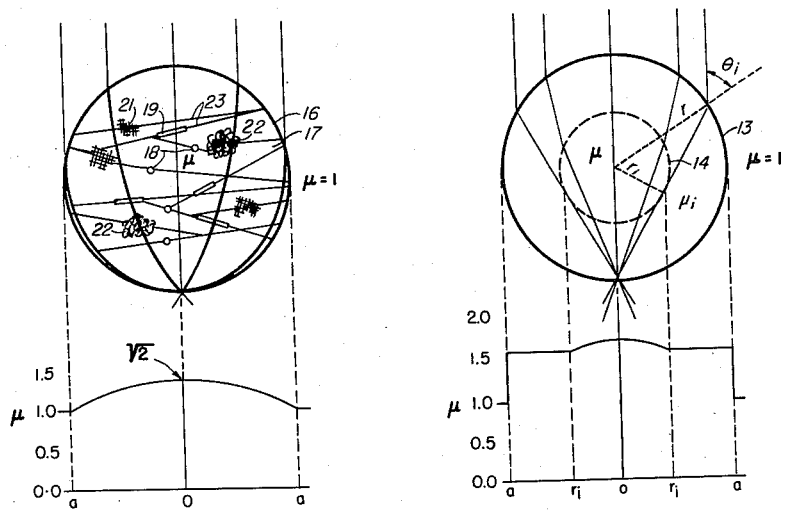
FIG. 2 shows a lens system employing concentric shells for varying the index of refraction.
FIG. 3 shows another lens system employing different means for varying the index of refraction.
Figure 4:
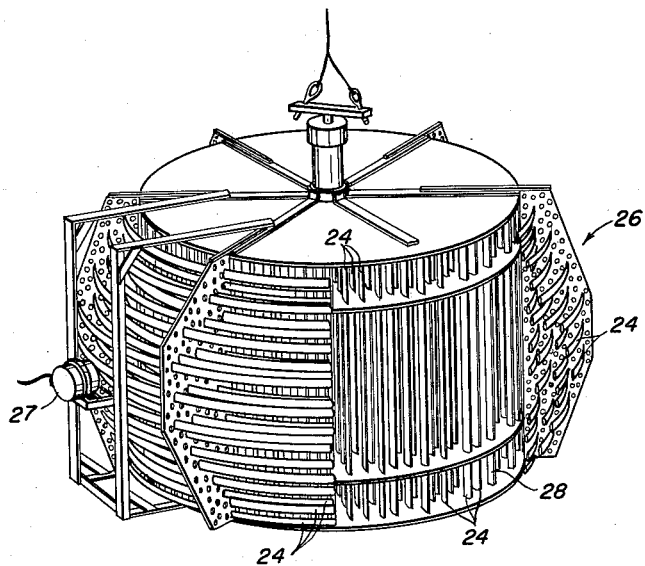
FIG. 4 is a pictorial view of a lens system employing compliant grating and one transducer.

There are four basic ways by which spherical lenses may be constructed. The simplest method as shown in FIG. 1 is to enclose within a thin circular shell 11 a liquid 12 with a uniform index of refraction throughout and with a velocity of sound somewhat more than half the velocity of sound of the external fluid. Focusing in this case occurs near the enclosing shell for distant sound sources. The second method is an extension of the first in which the lens is made with successive concentric shells 13, 14, containing different liquids to overcome spherical aberration as shown in FIG. 2. In this method, the spacing between shells must be less than a wave length and, consequently, a very large number of shells must be employed. In the third method, the lens is made with a shell 16 enclosing a liquid 17 with an index of refraction smaller than in the first method, and overcomes spherical aberration with mechanical means in the enclosed liquid that will alter its index of refraction as a function of the radius, and thus achieve a very sharp focus, as shown in FIG. 3. The simplest means of achieving this is to use solid metallic balls 18, rods 19, screen wire 21, or steel wool 22, suspended by wires 23 in the proper geometrical configuration. The fourth method differs from the others in that the liquid inside and outside the lenses need not be different and therefore an enclosing shell is not essential. In order to achieve a high index of refraction, all that is required is mechanical means in the desired configuration, which in this case consists of matter which is more compressible than the liquid. In the preferred embodiment, hollow disks, rectangular tubes, or round tubes which have been squashed to a flat ellipse are employed to supply the necessary compliance to the liquid and, thus, effectively reduce the velocity of sound through it. FIG. 4 shows squashed tubing 24 used in this method.

The first and third methods are satisfactory when the dimensions of the lens are relatively small, and, particularly, at the higher frequencies for active sonar applications. The second method is somewhat complex and unwieldy. The lens of the fourth method exhibits unusual versatility with high performance and low cost at both low and high frequencies, and is the most satisfactory method employed in the present invention.

Although the lens with a uniform index of refraction functions very effectively for most applications, its inherent spherical aberration is a limiting factor where very fine beams are necessary. This limitation is particularly apparent where very detailed pictures with underwater sound are needed. It has been demonstrated that according to the ray theory a point-focusing spherical lens can be made by varying the index of refraction as (1) $\mu = \sqrt{2 - (r/a)^2}$, where $a$ is the radius of the sphere and $r$ any radial point within it. For example, a spherical lens with an index of refraction $\mu = \sqrt{2}$ at the center and dropping continuously to $\mu = 1$ at the edge will have a point focus at the edge of the lens for plane waves. A lens designed in accordance with Equation 1, as shown in FIG. 3, however, appears to be handicapped by two undesirable characteristics: (a) the focal region of such a lens will tend to blur and wander in the presence of small irregularities such as air bubbles, seaweeds, and other unbalancing effects; (b) a continuously variable index of refraction is difficult to achieve and maintain. In practice these defects can be overcome to a large degree by an index of refraction which is greater than 1 at the edge and then tapering the index of refraction ($\mu$) as a function of the radius to achieve point focusing as shown in FIG. 2. This is an example of two concentric spheres in which the $\mu$ varies as $$(2) \quad \mu^2 = \mu_1^2 + \frac{1 + \cos \theta_1}{2} - (r/a)^2$$

for $a < r < r_1$ and $\mu = \mu_1$ for $r_1 < r < a$ and where also $\mu_1^2 = 2(1 + \cos \theta_1)$ where the value of $\theta_1$ depends on which ray is chosen to be tangent to the inner sphere (that is $r = r_1$).

The most obvious method by which a variable index of refraction may be achieved in a lens is the use of a multiplicity of concentric shells with the appropriate indexes of refraction suggested by Equations 1 or 2. This method is satisfactory so long as the spacing between shells is smaller than a wave length. Since a uniform index of refraction yields very satisfactory beams in lenses 10 to 20 wavelengths in diameter, the number of shells necessary to achieve beams much finer than 4° becomes inordinately high.

The index of refraction of a liquid, and therefore the velocity of sound in it, can be altered more markedly by changing its compressibility rather than density. This method is accomplished in the structure of the preferred species by the use of flattened metallic tubing as shown in FIG. 4.

Referring now to FIG. 4 there is shown a spherical lens 26 which requires neither an enclosing shell nor a liquid different from sea water. As shown, both the North and South poles are missing for simplicity in design and to demonstrate that the vertical directivity of the lens is not reduced appreciably by truncating the lens at the 45° latitude. The preferred embodiment used in explaining the principles of this invention is described as a compliant grating spherical lens because it utilizes flattened or squashed metallic tubes 24. The compliant or hollow metal tubing 24 employed in this lens will partially absorb any shock or sound waves carried by the surrounding liquid as a result of the compressibility of said tubing. Therefore the unit compliant grating area consisting of two adjacent compressible tubes in combination with the liquid area between said tubes and bounded thereby, would yield to a sound wave thereby providing a change in the index of refraction in the grating area as though a change in the media density had been induced. In other words the compressible compliant tubing grating in water would produce the same consequence as to increase the effective compressibility of water and, therefore, reduce the velocity of sound. A small transducer 27 is mounted near the outer surface of the lens to detect the sound concentrated by the much larger lens. While only one fixed transducer is shown for simplicity of illustration, it should be understood that a plurality of fixed transducers may be conveniently placed about the lens or rotatable scanning transducers may be used, depending upon the requirements of the operation.

The basic element of the lens 26 is commercially available aluminum tubing 24 flattened such that the thickness at the center is approximately twice the thickness of the edges. The free ends are closed with solder to prevent flooding. While the tubing in the outer section curves around the periphery of the lens, the inner core of the lens comprises vertical, spaced columns 28 of tubes 24. The spacing of the tubes increases slightly from the center to the edge of the lens such that the index of refraction will also vary, for example from 1.70 at the center to 1.58 at the edge.

In designing a compliant grating spherical lens for various frequencies, the proper tubing must be selected, depending upon the resonant frequency of the squashed tubes $$(3) \quad V_1 = 2.27 \left(\frac{\pi}{4}\right) \frac{t}{d^2} \sqrt{\frac{E}{3\rho}} \left(\frac{1}{\sqrt{1 + \frac{3\rho_0 d}{8\rho t}}}\right)$$

(which for Al, Fe, Mg, Ti and glass becomes $$(4) \quad V_1 \simeq \frac{t}{d^2} \frac{5 \times 10^5}{\sqrt{1 + \frac{3}{8} \frac{\rho_0 d}{\rho t}}}$$

and the center to center spacing, S, between the squashed tubes to achieve the desired index of refraction is indicated by $$(5) \quad (\mu_0^2 - 1) S^2 = \frac{7}{240} \frac{d^5}{t^3} \frac{M_0}{E}$$

where $d$ = inside width of squashed tube in cm.
$t$ = wall thickness of squashed tube in cm.
$E$ = Young's modules of squashed tube material
$\rho$ = density of squashed tube material
$\rho_0$ = density of fluid (or water)
$M_0$ = bulk modulus for water
$S$ = center to center spacing between squashed tubes
$\mu_0$ = index of refraction of the resultant configuration for low frequencies; i.e., the index of refraction is essentially constant at frequencies which are lower than $2/3 V_1$.

Among other factors that may influence the design of a lens is the depth at which the squashed tube collapses completely as expressed by (6) $$\text{Depth in feet} \simeq \frac{5F}{(d/t)^2}$$

where F is the ultimate strength of the material in pounds per square inch. Of course the value of F may be varied, such as by heat treatment. Another criterion that should guide in the proper selection of tubing is the relative volume occupied by the compliant material in the lens for a given index of refraction expressed by (7) $$\left.\begin{array}{c}\text{Relative volume occupied}\\ \text{by tubing in the lens}\end{array}\right\} \simeq \frac{2t(d+2t)}{S^2}$$

If this is greater than unity, it is obvious that such a lens is impractical. A value much less than unity is preferable.

Figure 5:
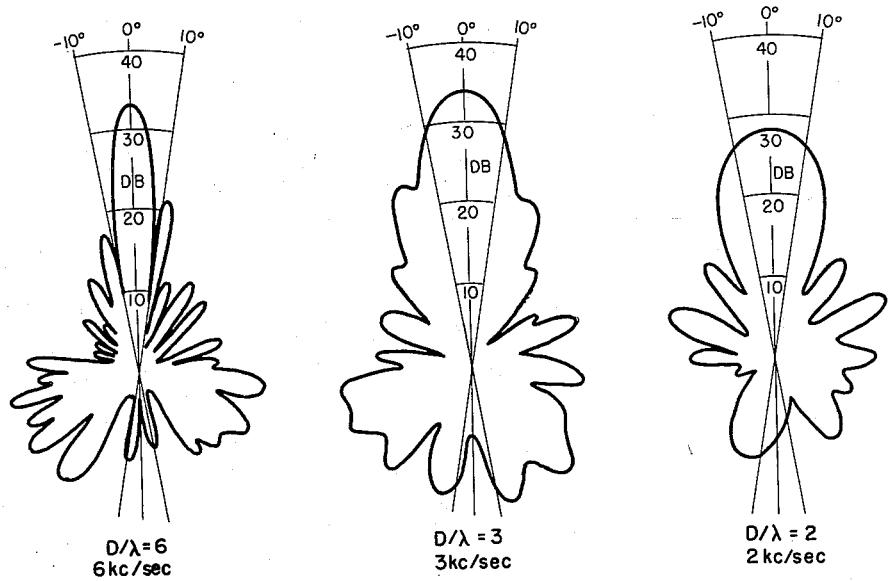
FIG. 5 shows samples of the directivity response of the lens system of FIG. 4 at three different frequencies.
Figure 6:
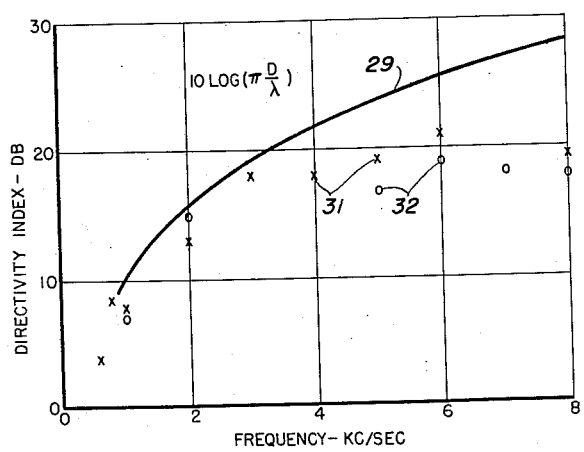
FIG. 6 shows the calculated directivity index of the lens system of FIG. 4 at various frequencies.

FIG. 5 shows samples of the lens' directivity response at three different frequencies. The calculated directivity index of these and other patterns are shown in FIG. 6 where the solid curve 29 corresponds to the index of refraction to be expected from a circular piston of the same diameter as the lens, the crosses 31 represent values from horizontal patterns of the lens and the circles 32 represent values from vertical patterns. Thus, truncating the lens, as shown in FIG. 4, has only a minor effect on directivity.

Figure 7:
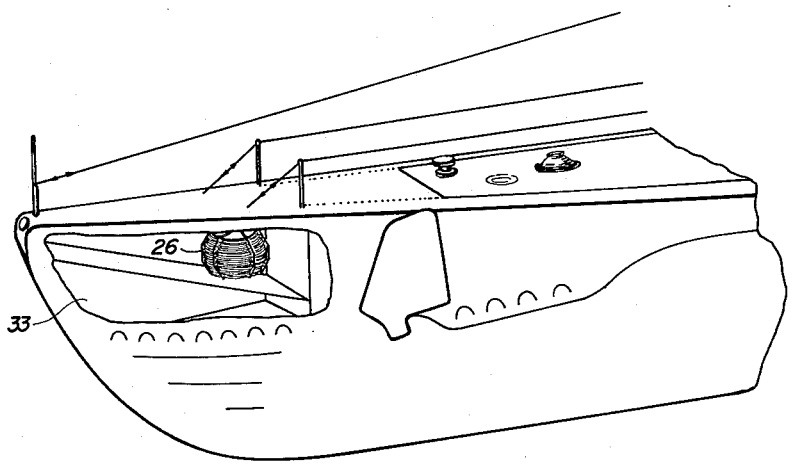
FIG. 7 shows in diagrammatic form a submarine bow buoyancy tank housing the spherical lens system of FIG. 4.
Figure 8:
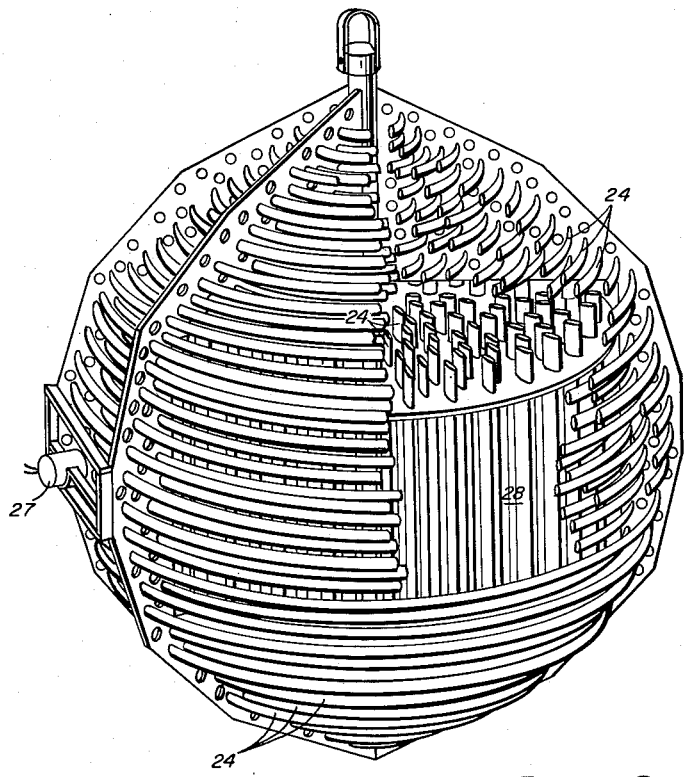
FIG. 8 is a pictorial view of the lens system shown in FIG. 4 with the North and South polar regions included.

Since the lens has application to all underwater sound detection systems it may be installed near a harbor, on shore or mounted on board a submarine as shown in FIG. 7. Here the lens is mounted in the submarine bow buoyancy tank 33 where it is electrically insulated from the hull to prevent rapid corrosion. While the buoyancy tank appeared to be acoustically forbidding, the signal-to-noise ratio measured in the submerged tank with a hydrophone and compared with another hydrophone hanging freely outside of the hull failed to show any obvious shielding effects for frequencies as high as 20 kc.

The lens employed in explaining the principles of this invention may be used in a variety of detection systems. For example, they may be used in the detection of biological life at sea either by the sounds associated with them or by active sonar techniques which depend upon the existence of certain discontinuities between the fish and water for detection. The lens may be used in the detection of electromagnetic waves as well as sound waves. As another example they may be used in a system for the geological survey of underground areas as well as for the survey of the sea bottom itself. In this system the lens is placed in a water filled hole in rock or other material in which the velocity of sound is greater than in water. With such a method, the detection and detailed mapping of faults and other discontinuities in the earth should aid greatly in the detection of buried natural resources.

Since the lens described in this application is as effective as lenses using high index of refraction liquids, can function efficiently at very low frequencies as well as frequencies up to 100 kc., and because they have very desirable acoustic properties and are highly versatile, so that their use may be included in the entire field of underwater sound detection, the lens may be made in a great variety of sizes and materials. It is therefore anticipated that many modifications to the preferred embodiment of the present invention will become obvious to those skilled in the art. It is therefore to be understood that within the scope of the appended claims the invention may be practiced otherwise than as specifically described.

What is claimed is:
1. In an underwater sound detection system, a truncated spherical lens formed of grating structure of hollow compliant tubing at a predetermined spacing and submerged in a liquid median whereby the effective compressibility of the liquid between adjacent tubes is increased for focusing sound waves at a focal point in close proximity to the periphery thereof, said lens being constructed of a material more compressible than said liquid media whereby the velocity of the sound waves is reduced in said liquid media between adjacent compliant tubes.

2. In an underwater sound detection system, a lens as in claim 1, said lens comprising a plurality of spaced apart hollow flattened compliant tubes whose central portions are approximately twice the thickness as at their edges and having a relative volume as compared with said liquid median of submergence of less than unity whereby the proper resonant frequency of the flattened tubing is provided to produce the selected index of refraction, said tubing being constructed and arranged so as to form a truncated sphere.

3. In an underwater sound detection system, a lens as in claim 1, said lens comprising a porous truncated sphere composed of spaced apart hollow flattened compliant tubing curved about the periphery thereof, and vertical spaced apart hollow flattened compliant tubing spaced throughout the interior thereof said tubing being closed at its free end to prevent flooding.

4. In an underwater sound detection system, a lens as in claim 3, said vertical interior hollow compliant tubing being spaced progressively closer toward the center of said lens whereby the index of refraction varies inversely with the tube spacing.

5. In an underwater sound deflection system, a truncated spherical lens submerged in a liquid media comprising compliant grating structure formed of hollow flattened tubing variably spaced in decreasing increments from the outer surface to the center of said lens whereby an index of refraction which increases from the outer surface of said lens to the center thereof in inverse proportion to the spacing of said tubes, is provided.

6. The system set forth in claim 5 wherein the cross-section thickness of said hollow tubing at the center is twice that at the edges.

7. The system set forth in claim 5 wherein the spacing of said hollow tubing is varied in inverse proportion to the predetermined index of refraction of the lens characteristics said spacing increases from the center toward the edge of said grating structure whereby the index of refraction is proportionately decreased.

8. The system set forth in claim 5 wherein said compliant grating structure comprises an outer horizontal section of spaced hollow compliant tubing concentric with the periphery of the lens and an inner core of spaced hollow vertical compliant tubing, said spacing increasing from the center toward the periphery in inverse proportion to the predetermined index of refraction of the lens design.

9. The system set forth in claim 5 including a transducer near the outer surface of the lens for detecting the sound concentrated by said lens.

10. In an underwater sound detection system, a spherical lens of compliant tubing at a predetermined spacing and submerged in a liquid medium whereby the effective compressibility of the liquid between adjacent tubes is increased for focusing sound waves at a focal point in close proximity to the periphery thereof, said lens being constructed of hollow compliant tubing more compressible than said liquid media whereby the velocity of the sound waves is reduced in the liquid media between adjacent compliant tubes.

11. In an underwater sound deflection system, a spherical lens submerged in a liquid media, said lens comprising a compliant grating structure formed of hollow flattened tubing variably spaced in decreasing increments from the outer surface to the center of said lens whereby an index of refraction which increases from the outer surface of said lens to the center thereof in inverse proportion to the spacing of said tubes is provided.

References Cited in the file of this patent

UNITED STATES PATENTS

| | | |
|---|---|---|
| 1,501,105 | Fessenden | July 15, 1924 |
| 2,420,676 | Peterson | May 20, 1947 |
| 2,528,730 | Rines | Nov. 7, 1950 |
| 2,576,182 | Wilkinson | Nov. 27, 1951 |
| 2,577,619 | Kock | Dec. 4, 1951 |
| 2,580,921 | Iams | Jan. 1, 1952 |
| 2,627,027 | Kock | Jan. 27, 1953 |
| 2,684,724 | Kock | July 27, 1954 |
| 2,761,141 | Strandberg | Aug. 28, 1956 |
| 2,801,412 | Maybury | July 30, 1957 |